US010489288B2

(12) United States Patent
Malladi et al.

(10) Patent No.: US 10,489,288 B2
(45) Date of Patent: Nov. 26, 2019

(54) ALGORITHM METHODOLOGIES FOR EFFICIENT COMPACTION OF OVERPROVISIONED MEMORY SYSTEMS

(71) Applicant: Samsung Electronics Co., Ltd., Suwon-si, Gyeonggi-do (KR)

(72) Inventors: Krishna T. Malladi, San Jose, CA (US); Hongzhong Zheng, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 15/470,261

(22) Filed: Mar. 27, 2017

(65) Prior Publication Data

US 2018/0210659 A1    Jul. 26, 2018

Related U.S. Application Data

(60) Provisional application No. 62/450,502, filed on Jan. 25, 2017.

(51) Int. Cl.
*G06F 3/06* (2006.01)
*G06F 12/02* (2006.01)

(52) U.S. Cl.
CPC .... *G06F 12/023* (2013.01); *G06F 2212/1044* (2013.01)

(58) Field of Classification Search
CPC ............... G06F 12/023; G06F 3/0641; G06F 2212/1044
See application file for complete search history.

(56) References Cited

U.S. PATENT DOCUMENTS

| 6,088,777 A * | 7/2000 | Sorber ................. G06F 12/023 370/381 |
| 6,438,560 B1 | 8/2002 | Loen |
| 7,650,460 B2 | 1/2010 | Cheriton |
| 8,065,476 B2 | 11/2011 | Cheriton |
| 8,230,168 B2 | 7/2012 | Cheriton |

(Continued)

OTHER PUBLICATIONS

Y. Fu, H. Jiang, N. Xiao, L. Tian, F. Liu and L. Xu, "Application-Aware Local-Global Source Deduplication for Cloud Backup Services of Personal Storage," in IEEE Transactions on Parallel and Distributed Systems, vol. 25, No. 5, pp. 1155-1165, May 2014. (Year: 2014).*

(Continued)

*Primary Examiner* — Ramon A. Mercado
(74) *Attorney, Agent, or Firm* — Lewis Roca Rothgerber Christie LLP (57) ABSTRACT

A method of dynamically selecting deduplication granularity in a memory system to decrease deduplication granularity and to increase hash-table efficiency, the method including selecting one or more deduplication granularities at an application level of an application using the memory system, the one or more deduplication granularities being selected according to features of the memory system, and assigning a memory region corresponding to each of the one or more selected deduplication granularities, where the method may use a memory manager to share memory translation table and hash table, and may be employed by a system that enables using higher capacity pre-allocated counter fields for frequently utilized lines.

14 Claims, 3 Drawing Sheets

(56) References Cited

U.S. PATENT DOCUMENTS

| | | | |
|---|---|---|---|
| 8,484,356 B1* | 7/2013 | Douglis | G06F 11/1453 709/226 |
| 8,504,791 B2 | 8/2013 | Cheriton et al. | |
| 8,612,673 B2 | 12/2013 | Cheriton | |
| 8,639,669 B1* | 1/2014 | Douglis | G06F 3/0641 707/692 |
| 8,650,163 B1 | 2/2014 | Harnik et al. | |
| 8,751,763 B1 | 6/2014 | Ramarao | |
| 8,918,605 B2 | 12/2014 | Aronovich et al. | |
| 8,938,580 B2 | 1/2015 | Cheriton | |
| 8,977,812 B1* | 3/2015 | Chen | G06F 3/0608 707/692 |
| 9,110,602 B2 | 8/2015 | Vijayan et al. | |
| 9,122,639 B2 | 9/2015 | Kennedy et al. | |
| 9,292,440 B2 | 3/2016 | Shalvi et al. | |
| 9,348,538 B2* | 5/2016 | Mallaiah | G06F 3/0608 |
| 9,442,806 B1* | 9/2016 | Bardale | G06F 11/1453 |
| 9,465,808 B1* | 10/2016 | Karr | G06F 3/06 |
| 9,501,421 B1 | 11/2016 | Cheriton | |
| 9,520,193 B2 | 12/2016 | Cheriton | |
| 2011/0125722 A1* | 5/2011 | Rao | G06F 16/1744 707/693 |
| 2012/0150954 A1* | 6/2012 | Tofano | G06F 9/5066 709/204 |
| 2012/0166448 A1* | 6/2012 | Li | G06F 16/137 707/747 |
| 2013/0054544 A1* | 2/2013 | Li | G06F 11/1004 707/693 |
| 2013/0275699 A1 | 10/2013 | Cheriton | |
| 2014/0059271 A1 | 2/2014 | Meir et al. | |
| 2014/0358872 A1* | 12/2014 | Shin | G06F 16/1748 707/692 |
| 2015/0066876 A1 | 3/2015 | Li et al. | |
| 2015/0074339 A1 | 3/2015 | Cheriton | |
| 2016/0026653 A1 | 1/2016 | Caro et al. | |
| 2016/0291891 A1 | 10/2016 | Cheriton | |
| 2017/0103068 A1* | 4/2017 | Araki | G06F 17/3015 |
| 2017/0109049 A1 | 4/2017 | Cheriton | |
| 2018/0210659 A1* | 7/2018 | Malladi | G06F 3/0641 |
| 2018/0253253 A1* | 9/2018 | Sakamoto | G06F 3/0608 |

OTHER PUBLICATIONS

Cheriton, David, et al., "HICAMP: Architectural Support for Efficient Concurrency-safe Shared Structured Data Access", ASPLOS XVII Proceedings of the seventeenth international conference on Architectural Support for Programming Languages and Operating Systems, Mar. 3-7, 2012, pp. 287-300.

Litz, Heiner, et al., "Fine-grain Memory Deduplication for In-Memory Database Systems", Stanford University, 2013, 22 pages.

Kim, Yoongu, "HICAMP: Architectural Support for Efficient Concurrency-Safe Shared Structured Data Access—Cheriton et al.,", ASPLOS 2012; Nov. 18, 2013 (43 pages).

Stevenson, John Peter; "Fine-Grain In-Memory Deduplication for Large-Scale Workloads"; A Dissertation Submitted to the Department of Electrical Engineering and the Committee on Graduate Studies of Stanford University in Partial Fulfillment of the Requirements for the Degree of Doctor of Philosophy; http://purl.stanford.edu/rp831pj6163; Dec. 2013 (140 pages).

* cited by examiner

ALGORITHM METHODOLOGIES FOR EFFICIENT COMPACTION OF OVERPROVISIONED MEMORY SYSTEMS

CROSS-REFERENCE TO RELATED APPLICATION(S)

This application claims priority to, and the benefit of, U.S. Provisional Application Ser. No. 62/450,502, filed on Jan. 25, 2017, the entire content of which is incorporated herein by reference.

BACKGROUND

1. Field

An aspect of the present disclosure relates to memory systems.

2. Description of the Related Art

Modern applications, such as databases, virtual desktop infrastructure, and data analytics, have a relatively large main memory footprint. As systems scale out, memory capacity should also increase, and should increase super-linearly.

Although dynamic random-access memory (DRAM) technology scales aggressively beyond the 20 nm semiconductor device fabrication node, in order to increase memory capacity super-linearly, architects may also apply system-level techniques, such as memory deduplication, to thereby increase the virtual capacity of memory by as much as a factor of two or three. One possible algorithm architecture may integrate such memory systems by using a hash table-like mechanism to store unique data content. In addition to using a hash table, reference counters, and translation tables, other datastructures may also be used to reliably keep track of unique lines of data, and to remove lines of data that are no longer referenced by a corresponding underlying memory address. However, such techniques increase metadata overhead, thereby effectively undermining the original intent of deduplication (e.g., the intent of increasing the effective usable memory capacity).

Accordingly, problems in the related art may include the following: shortcomings of new memory technologies; poor write latency, decreased bandwidth, issues associated with the endurance of the physical memory system; complicated management of non-volatile memory; high cost-to-bit ratio; ineffective use of DRAM deduplication for storing unique content; the presence of metadata structures, such as translation tables and reference counters, within the algorithm; and failure to reliably achieve a high data compaction ratio.

SUMMARY

Embodiments of the present disclosure provide an algorithm architecture for a memory system. The algorithm architecture may have three different main architectural techniques that increase effective capacities of the memory system, while also effectively using deduplication hash table, thereby improving a deduplication ratio of the memory system without substantially increasing metadata overhead, and without burdening performance of the memory system.

The hardware and the software mechanisms for deploying the three main architectural techniques employed by the algorithm architecture are described below. The three main architectural techniques include hash table efficiency (without increasing additional overhead), translation table efficiency, and reference counter efficiency. A path for efficient metadata management in the memory system is also described below.

Embodiments of the present disclosure also reduce the overhead of auxiliary datastructures in a deduplication-based memory system, and also increase the efficiency of deduplicating unique data content by providing the dynamic ability to choose a suitable deduplication granularity. The algorithms of the described embodiments also provide higher effective deduplication ratios for different applications, and improve three of the biggest contributors to deduplication metadata.

According to an aspect of the present disclosure, there is provided a method of dynamically selecting deduplication granularity in a memory system to decrease deduplication granularity and to increase hash-table efficiency, the method including selecting one or more deduplication granularities at an application level of an application using the memory system, the one or more deduplication granularities being selected according to features of the memory system, and assigning a memory region corresponding to each of the one or more selected deduplication granularities.

Selecting the one or more deduplication granularities may include using a software driver corresponding to the application using the memory system.

The method may further include rebooting the memory system to implement parameters resulting from the selection of the one or more deduplication granularities by the software driver.

Selecting the one or more deduplication granularities may include partitioning a memory space into memory regions, each of the memory regions corresponding to a respective one of the one or more deduplication granularities.

Partitioning the memory space into memory regions may be performed by a kernel driver of the memory system.

Selecting the one or more deduplication granularities may include observing historical trends or patterns of the memory system, and dynamically assigning a respective one of the one or more deduplication granularities for each cache line.

A deduplication system-on-a-chip (SoC) on a deduplication memory module of the memory system may be used for the observing the historical trends or patterns of the memory system.

The historical trends or patterns of the memory system may include an application pattern history, a deduplication ratio, or projected table overheads.

Selecting the one or more deduplication granularities may include partitioning a memory space into two memory regions, each of the memory regions corresponding to a respective one of two deduplication granularities as the one or more deduplication granularities, performing both of the two deduplication granularities on an incoming cache line, and storing a table in each of the two memory regions for each of the deduplication granularities.

A deduplication system-on-a-chip (SoC) on a deduplication memory module of the memory system may be used for performing both of the two deduplication granularities on the incoming cache line, and for storing the table in each of the two memory regions.

According to an aspect of the present disclosure, there is provided a method of improving capacity in a memory system by increasing a deduplication ratio, the method including establishing a memory region that is logically contiguous with a memory manager.

The method may further include tuning aspects of the memory region using firmware.

The method may further include sharing the memory region with a hash table memory and a translation table.

The method may further include incrementing a reference counter when a unique deduplicated data line is referenced by a new line, and decrementing the reference counter when a value corresponding to a number of lines referencing the unique deduplicated data line is decreased.

The method may further include varying a size of the reference counter.

The method may further include improving reference counter efficiency by pre-allotting an additional reference counter having a higher bit size than the reference counter, and migrating overflowing ways of a hash table memory (HTM) containing repeatedly referenced data lines to a field corresponding to the additional reference counter.

According to an aspect of the present disclosure, there is provided a method of varying a reference counter size in a memory system, the method including providing a first reference counter having a first bit size, and a second reference counter having a second bit size that is higher than the first bit size, performing one-to-one mapping between lines of data of a hash table memory (HTM) and locations of the first and second reference counters, detecting a nearing maximum counter value of the first reference counter, and promoting the first reference counter to a higher field value.

The promoting the first reference counter to a higher field value may include switching logical locations of a first way of the HTM corresponding to the first reference counter and a second way of the HTM corresponding to the second reference counter.

The method may further include tracking the switching of the logical locations of the first and second ways by using a flag to accurately classify an operating state of the first and second reference counters.

The method may further include using a field to track a destination of the promoted first reference counter.

According to an aspect of the present disclosure, there is provided a system architecture for deploying a deduplication memory module, and for being controlled by a driver or a system-on-a-chip (SoC) to select one or more deduplication granularities at an application level of an application using the memory system, the one or more deduplication granularities being selected according to features of the memory system, and assign a memory region corresponding to each of the one or more selected deduplication granularities.

BRIEF DESCRIPTION OF THE DRAWINGS

Embodiments will now be described more fully hereinafter with reference to the accompanying drawings. However, the embodiments may be embodied in different forms and should not be construed as limited to the specific embodiments set forth herein. Rather, these embodiments are provided so that the present disclosure will be thorough and complete, and will fully convey the scope of the embodiments to those skilled in the art, wherein.

DETAILED DESCRIPTION

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects of the present invention to those skilled in the art. Accordingly, processes, elements, and techniques that are not necessary to those having ordinary skill in the art for a complete understanding of the aspects of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 3:
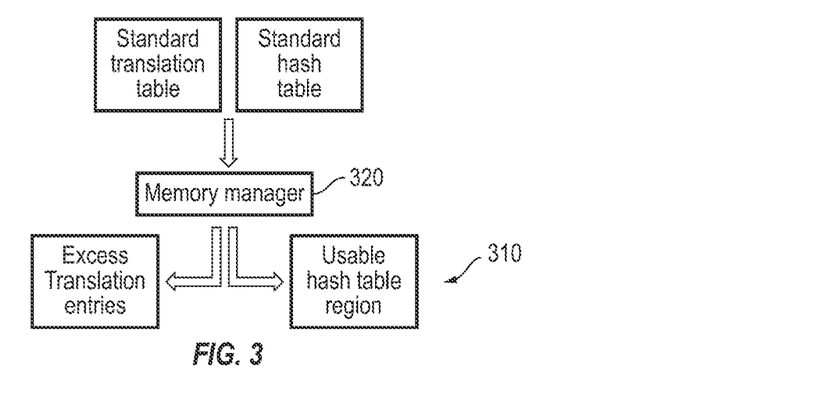
FIG. 3 is a block diagram depicting a method of dynamic deduplication granularity overprovisioning, according to an embodiment.

FIG. 3 is a block diagram depicting a system memory hierarchy with deduplication, according to an embodiment.

Figure 1:
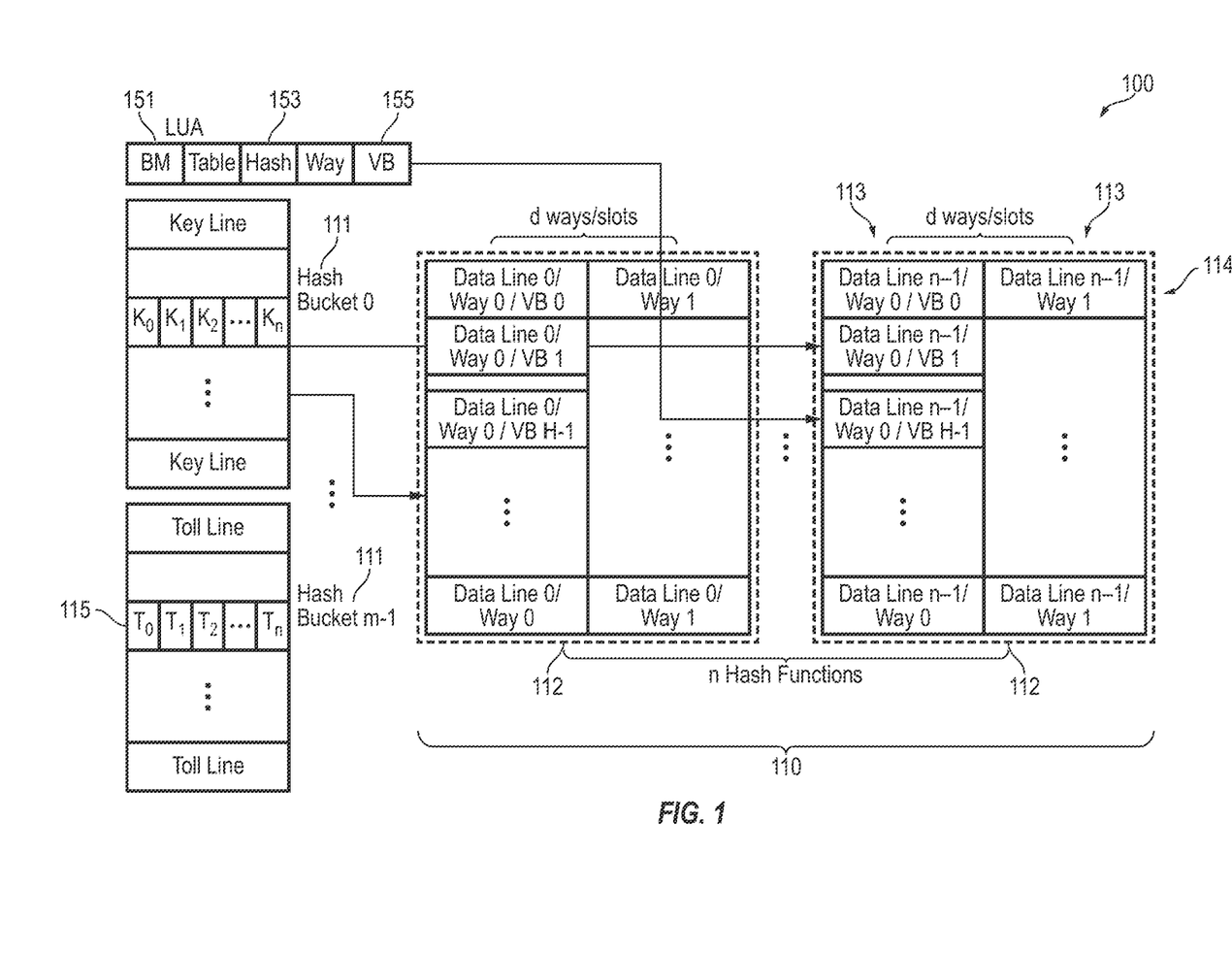
FIG. 1 is a block diagram depicting a system memory hierarchy with deduplication, according to an embodiment.

Referring to FIG. 1, a description of an algorithm architecture for deduplication in a memory system, which uses an efficient hash table with dynamic granularity, is provided. The algorithm architecture of the present embodiment provides three architectural techniques for efficiently deploying data deduplication in a memory system 100 (e.g., a DRAM system). While deduplication memory systems may increase memory density by virtue of storing only unique lines of data, additional datastructures associated therewith generally add overhead that reduces the effective ratio, and which may more significantly add overhead at higher memory densities.

The memory system 100 of the present embodiment is a deduplication DRAM system. The memory system 100 may contain one or more hash tables of a hash table memory (HTM) 110 for storing lines of data at some data granularity, a translation table 120 for presenting an indirection interface to a corresponding CPU host address, and a datastructure for forming one or more reference counters 130 for storing a total number of referring entries for each unique data line that is stored in the HTM 110.

It should be noted, however, that both the translation table 120 and the reference counter(s) 130 result in additional data overhead, thereby reducing the deduplication ratio. In addition, the efficiency of the HTM 110 may be improved for smaller data granularities, although electing to use a small data granularity may commensurately increase metadata overhead of the memory system 100.

The three architectural techniques of the present embodiment, as described below, navigate challenges associated with the performance of the memory system 100 while concurrently improving the deduplication ratio of the memory system 100. For example, to achieve efficiency of the HTM 110 without increasing overhead, the present embodiment improves efficiency of the translation table 120 and efficiency of the reference counter(s) 130 to thereby create an efficient HTM 110 with dynamic, or selectable, data granularity.

Efficiency of the reference counter(s) 130 may be achieved by providing architectural methods to decrease metadata overhead by providing a software-transparent hardware architecture, and by providing a software driver-coupled architecture including an intelligent software driver.

In the present embodiment, data organization may be accomplished by using the following: an address lookup table (LUT) memory (ALUTM) including a store device for storing address-to-LUT address mapping; a three-dimensional hash table memory (HTM) 110. The HTM includes "m" hash buckets 111 by "n" hash tables 112 by "d" slots/ways 113 (each two-dimensional hash table 112 corresponding to a respective hash function of the HTM 110, each hash table including m hash buckets 111 and d ways 113) for storing data values in the HTM 110; buffer memory (BM) as a reserved region for system-on-a-chip (SoC) memory buffer/cache and virtual density over-provision management (HTM overflow); and a virtual bucket (VB) 155 for data placement in nearby hash buckets 111 and having a VB 155 height of "h" hash buckets 111 (m, n, d, and h representing integers).

The deduplication granularity may play a role in readily finding data line matches in the HTM 110, and may result in the storage of lesser unique content to ultimately improve the deduplication ratio. The HTM 110 is organized as a three-dimensional datastructure including hash buckets 111 that contain values with a same hash 153. Within a hash bucket 111, data lines are organized using a secondary hash to assist locating data lines with low complexity, and to reduce hardware overhead without linear chaining. In addition, multiple hash tables 112, further increase the HTM 110 efficiency by having comparatively fewer data collisions. Furthermore, each data line entry in the HTM 110 also has an additional structure, which may be referred to as "toll" 115, for tracking the reference count of that value.

The present embodiment may include the following algorithm parameters: a 16-bit signature; 32 ways 113 (i.e., d=32); 24-bit toll 115 size; and VB 155 height of four (i.e., h=4). For example, a relatively basic implementation of this algorithm architecture may have a 64-byte deduplication granularity, which is consistent with the CPU cache line size. However, the deduplication ratio may be improved when the deduplication granularity is reduced to a smaller size (e.g., a 32-byte deduplication granularity).

Figure 4:
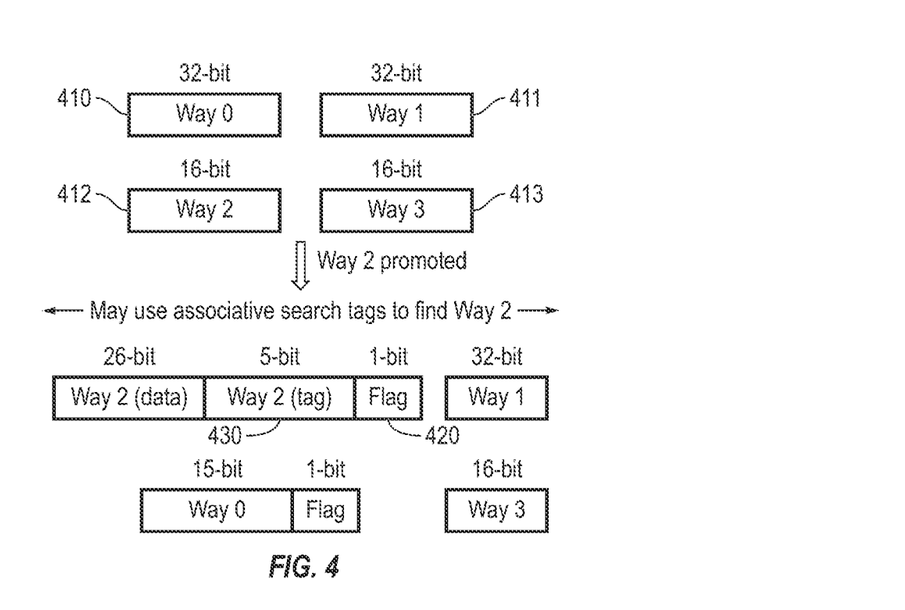
FIG. 4 is a block diagram depicting a counter cache architecture, according to an embodiment.

However, a decrease in deduplication granularity corresponds to an increase in overhead (e.g., a 32-byte deduplication granularity may add up to 20% additional overhead when compared to a 64-byte deduplication granularity) to enable storage of a larger number of data line entries, and to enable storage of the associated translation entries in the translation table 120 that is separate from the HTM 110. The tradeoff between granularity and overhead may depend on characteristics of a particular application employing the present embodiment, and may depend on a usage scenario. Accordingly, providing a dynamic, selectable granularity with adaptive behavior may yield high deduplication irrespective of the applications using the memory system 100 by enabling adaptation to different applications FIG. 4 is a block diagram depicting methods for dynamic deduplication granularity architecture, according to an embodiment.

Figure 2:
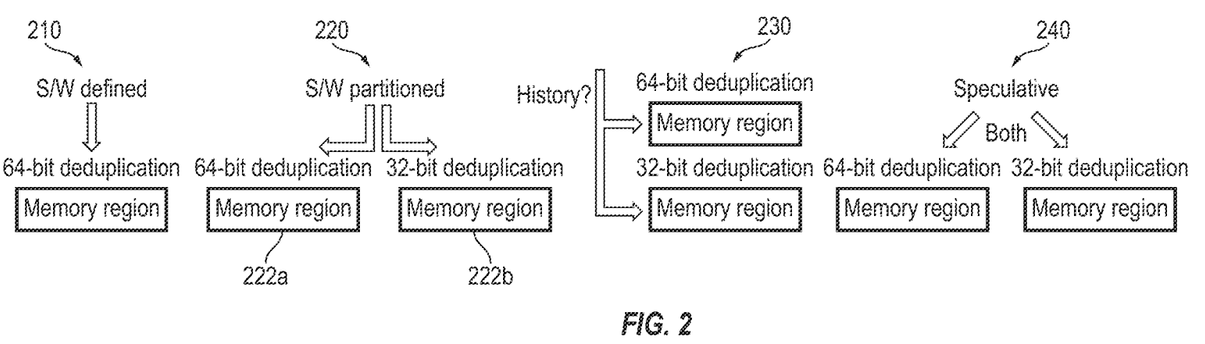
FIG. 2 is a block diagram depicting methods for dynamic deduplication granularity architecture, according to an embodiment.

Referring to FIG. 2, four methods for choosing deduplication granularity at the application level (e.g., in the memory system 100 of FIG. 1) may use a device driver/kernel driver, and may increase efficiency of the translation table 120.

A first method 210 is a software-defined method for choosing deduplication granularity. In the present method, a driver of the software may be used to define deduplication granularity, and may employ a system reboot feature to adjust hardware parameters and allocations to implement the chosen deduplication granularity (e.g., 64-bit deduplication granularity).

A second method 220 is a software-partitioned method for choosing the deduplication granularity. In the present method, a kernel driver for a deduplication memory may partition the memory space into two different memory regions 222a and 222b, each memory region 222 having a different respective deduplication granularity (e.g., 32-bit deduplication granularity in one memory region 222b and 64-bit deduplication granularity in another memory region 222a). One memory region of the memory space (e.g., memory region 222a) may have a baseline deduplication ratio or deduplication ratio, and the other memory region 222 of the memory space (e.g., memory region 222b) may have a lower deduplication granularity. As a result, an overall intermediate deduplication ratio may be achieved while modestly increasing overhead (increasing overhead by about 15%).

A third method 230 is an adaptive method for choosing the deduplication granularity. In the present method, a deduplication system-on-a-chip (SoC) may be located on a deduplication memory module for learning an improved deduplication granularity by observing and analyzing historical trends and other patterns of the memory system 100, such as, and for example, an application pattern history, a provided deduplication ratio, and/or projected table overheads. Based on its observational analysis, the deduplication SoC may dynamically assign deduplication granularity for each cache line (e.g., 32-bit deduplication granularity or 64-bit deduplication granularity), and may store the assigned deduplication granularity in the HTM 110.

A fourth method 240 is a speculative method for choosing the deduplication granularity. In the present method, the deduplication SoC of the third method 230 may perform both of two different deduplication granularities (e.g., 64-byte deduplication and 32-byte deduplication) on an incoming cache line, and may store tables in different regions of the memory system 100 for both of the differing granularities. The different granularities may be stored under the assumption that enough space exists in the memory for storing metadata for both implementations. As tables grow, however, garbage collection may heuristically remove one of the translation entries, thereby resulting in a final state that stores a suitable deduplication granularity for a cache line. Accordingly, because both of the granularities are stored speculatively, the present method provides additional opportunities for effectively finding duplicates.

FIG. 3 is a block diagram depicting a method of dynamic deduplication granularity overprovisioning, according to an embodiment.

Referring to FIG. 3, when deduplication overprovisioning algorithms are fixed in hardware, complexity of implementation is low because of the use of a fixed translation table region, and a fixed hash table size. However, a maximum limit may exist. To address higher capacity with the deduplication algorithm, improving the deduplication ratio while also expanding translation tables may be difficult when implementing fixed hardware resources. However, the present embodiment may be able to increase a deduplication ratio beyond previously presumed maximum limits. The deduplication ratio may be improved, but may waste translation table resources that are allotted in hardware, while an improved deduplication ratio might not be used for all application scenarios.

The present embodiment addresses this problem by using a method of dynamic overprovisioning 300 to allow the translation table 120 to increase the deduplication ratio beyond what was previously believed to be a maximum value. The present embodiment contains an additional memory region 310 that is logically contiguous with an operating system (OS)-like memory manager 320. The additional memory region 310 may be completely implemented in hardware while using firmware "knobs" that may be controlled by the deduplication driver to tune aspects of the memory region 310. This additional memory region 310 may be shared by the HTM 110 and the additional translation table 120. Further, read accesses and write accesses to the added memory region 310 may be more expensive due to additional indirection. However, the dynamic translation table 120 design of the present embodiment enables the deduplication SoC to adapt to applications having high deduplication ratios.

Additional tradeoffs may exist by using fixed deduplication overprovisioning. The driver-defined fixed overprovisioning may simplify product design, and may provide a uniformly lower read/write latency. Also, the dynamic design allows a SoC to adapt to applications with high deduplication ratio In addition to the HTM 110 and translation tables 120, another contributing factor to the deduplication memory region is "toll" 115, or the reference counter(s) 130, which may refer to the same concept. A reference counter 130 is a hardware counter that is incremented when a unique deduplicated data line is referenced by a new line, and that is decremented when that value changes. Typically, 32-bit counters sufficiently hold even the most frequently referenced data lines. However, many application usage scenarios have a long-tail latency behavior, where most data lines grossly under-utilize the reference counter(s) 130, thereby adding to the overhead. Moreover, when the deduplication granularity is decreased (e.g., to 32-byte deduplication granularity), there will be a greater number of unique cache lines, thereby increasing the overall counter overhead.

By simply having a variable reference counter size to enable decreasing the reference counter bit size to a smaller value (e.g., 16 bits), the hardware overhead may be decreased, but may potentially experience reference counter overflow, thereby sending the additional unique data lines to the overflow region for holding the data lines that cannot be accommodated, thereby harming the deduplication ratio. Unlike software allocations, hardware allocations may be pre-defined, thus precluding opportunities to increase counter size to suit the implemented application.

The present method of dynamic overprovisioning 300 addresses this by providing a "counter-cache" methodology to achieve an efficient reference counter(s) 130 without wasting hardware resources by sharing with the overflow region. That is, the present embodiment may pre-allot some reference counters 130 having a higher bit size, and may then use cache-like policies to migrate overflowing ways 113 of the HTM 110 that contain highly referenced data lines, the overflowing ways being migrated to locations with longer field reference counter(s) 130s.

Accordingly, the present method of dynamic overprovisioning 300 may use a counter cache, which may be able to pre-allot higher bit-size counters, may use policy to migrate overflowing ways 113 to longer fields, may provide for a way 113 movement policy, and may assign a home node such that there are no additional migrations after a single migration for a counter field. The present method of dynamic overprovisioning 300 may also provide further simplification by providing one-to-one mapping, irreversible swapping. The counter cache may suitably afford a small overhead for storing the migration or swapped way information embedded into the counter bits themselves.

FIG. 4 is a block diagram depicting a counter cache architecture, according to an embodiment.

Referring to FIG. 4, a counter cache architecture 400 is depicted in detail. In the present example, Way 0 410 and Way 1 411 are 32 bits in size, while Way 2 412 412 and Way 3 413 are 16 bits each. Initially, there is one-to-one mapping between the lines of data of the HTM 110 and the corresponding reference counter(s) 130 locations. However, as applications increasingly use the HTM 110, Way 2 412 may be used with increasing frequency, and the corresponding reference counter 130 may approach a maximum counter value (i.e., 2^ 16 in the present example due to Way 2 412 having 16 bits). When the reference counter 130 reaches a maximum counter value, internal logic of the SoC "promotes" Way 2 412 to a higher field value.

In the present example, Way 2 412 is promoted to Way 0 410, by swapping the logical locations of Way 0 410 and Way 2 412. However, flipping the logical location of two different ways 113 should be tracked to accurately classify the reference counter 130 of a cache line. Accordingly, not all 32 bits are used for the reference counter 130. In the present example, a 1-bit flag 420 may be dedicated for notification of a respective promotion/demotion of the ways 113 for the line. Further, another 4-bit or 5-bit field, which may be referred to as a "tag" 430, may be used to track the destination reference counter location, thereby leaving 26 bits of usable space remaining for the reference counter 130.

To simplify a way movement policy, home nodes may be assigned for each line, and may disallow additional migrations after the first way migration. The present embodiment may be further simplified with a one-to-one mapping to migrate that designates only a single high bit counter for each low bit counter, and that removes reversible swapping.

According to the embodiments described above, by using the three described architectures, an algorithm architecture may increase the effective deduplication ratio of memory systems without increasing the translation table or the reference counter overheads. While the described embodiments may be implemented completely in hardware while remaining transparent to the driver, an alternative embodiment encapsulates the same hardware behavior while placing the decision control knobs in the driver for additional flexibility.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth by the following claims and their functional equivalents.

What is claimed is:

1. A method of dynamically selecting deduplication granularity in a memory system comprising a cache to decrease deduplication granularity and to increase hashtable efficiency, the method comprising:
    selecting one or more deduplication granularities at an application level of an application using the memory system based at least in part on historical data associated with the memory system, and dynamically assigning the one or more deduplication granularities for a cache line comprising a unit of data transfer, the one or more deduplication granularities being selected according to features of the memory system; and
    assigning a memory region corresponding to the one or more selected deduplication granularities.

2. The method of claim 1, wherein selecting the one or more deduplication granularities comprises using a software driver corresponding to the application using the memory system.

3. The method of claim 2, further comprising rebooting the memory system to implement parameters resulting from the selection of the one or more deduplication granularities by the software driver.

4. The method of claim 1, wherein selecting the one or more deduplication granularities comprises partitioning a memory space into memory regions, the memory regions corresponding to the one or more deduplication granularities.

5. The method of claim 4, wherein partitioning the memory space into memory regions is performed by a kernel driver of the memory system.

6. The method of claim 1, wherein a deduplication system-on-a-chip (SoC) on a deduplication memory module of the memory system is used for observing the historical data associated with the memory system.

7. The method of claim 1, wherein the historical data associated with the memory system comprise an application pattern history, a deduplication ratio, or projected table overheads.

8. A method of dynamically selecting deduplication granularity in a memory system comprising a cache to decrease deduplication granularity and to increase hashtable efficiency, the method comprising:
    selecting one or more deduplication granularities at an application level of an application using the memory system, the one or more deduplication granularities being selected according to features of the memory system; and
    assigning a memory region corresponding to the one or more selected deduplication granularities,
    wherein selecting the one or more deduplication granularities comprises:
        partitioning a memory space into two memory regions, the memory regions corresponding to two deduplication granularities as the one or more deduplication granularities;
        performing both of the two deduplication granularities on an incoming cache line comprising a unit of data transfer;
        storing a table in the two memory regions for the deduplication granularities; and
        discarding a table entry of one of the tables depending on learned history when a combined capacity of both of the tables of the two memory regions either increases or reaches a threshold.

9. The method of claim 8, wherein a deduplication system-on-a-chip (SoC) on a deduplication memory module of the memory system is used for performing both of the two deduplication granularities on the incoming cache line, and for storing the table in the two memory regions.

10. The method of claim 8, wherein selecting the one or more deduplication granularities comprises using a software driver corresponding to the application using the memory system.

11. The method of claim 10, further comprising rebooting the memory system to implement parameters resulting from the selection of the one or more deduplication granularities by the software driver.

12. The method of claim 8, wherein selecting the one or more deduplication granularities comprises partitioning a memory space into memory regions, each of the memory regions corresponding to the one or more deduplication granularities.

13. The method of claim 12, wherein partitioning the memory space into memory regions is performed by a kernel driver of the memory system.

14. A system architecture for deploying a deduplication memory module, and for being controlled by a driver or a system-on-a-chip (SoC) to:
    select one or more deduplication granularities at an application level of an application based at least in part on historical data associated with a memory system comprising a cache, and dynamically assigning the one or more deduplication granularities for a cache line comprising a unit of data transfer, the one or more deduplication granularities being selected according to features of the memory system; and
    assign a memory region corresponding to each of the one or more selected deduplication granularities.

* * * * *